US012705366B2

(12) United States Patent
Opedal

(10) Patent No.: US 12,705,366 B2
(45) Date of Patent: Aug. 11, 2026

(54) PENETRATION TESTING OF APPLICATION PROGRAMMING INTERFACE ENDPOINTS USING SECURITY AGENTS

(71) Applicant: T-Mobile USA, Inc., Bellevue, WA (US)

(72) Inventor: Olav Opedal, Ellensburg, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 66 days.

(21) Appl. No.: 18/975,784

(22) Filed: Dec. 10, 2024

(65) Prior Publication Data

US 2026/0161795 A1 Jun. 11, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ... G06F 21/57; G06F 2221/034; G06F 21/577
USPC ........................................................ 726/25
See application file for complete search history.

(56) References Cited

U.S. PATENT DOCUMENTS

| | | | | |
|---|---|---|---|---|
| 6,625,648 | B1 | 9/2003 | Schwaller et al. | |
| 9,600,402 | B2 | 3/2017 | Kruglick | |
| 9,729,506 | B2 | 8/2017 | Call et al. | |
| 9,733,993 | B2 | 8/2017 | Mital et al. | |
| 9,785,484 | B2 | 10/2017 | Mital et al. | |
| 9,930,103 | B2 | 3/2018 | Thompson | |
| 10,432,499 | B2 | 10/2019 | Paropkari et al. | |
| 10,521,246 | B1 | 12/2019 | Jain et al. | |
| 10,542,050 | B2 * | 1/2020 | Castel | H04L 12/40 |
| 10,572,370 | B2 | 2/2020 | Bahrami et al. | |
| 10,754,628 | B2 | 8/2020 | Hernan et al. | |
| 11,017,002 | B2 | 5/2021 | Liu et al. | |
| 11,108,803 | B2 * | 8/2021 | Wilton | H04L 63/0281 |
| 11,132,278 | B2 | 9/2021 | Joyce et al. | |
| 11,321,467 | B2 * | 5/2022 | Wang | H04L 63/1433 |
| 11,379,258 | B1 | 7/2022 | Perea Ramos et al. | |
| 11,470,159 | B2 * | 10/2022 | Pang | H04L 63/168 |
| 11,544,120 | B2 | 1/2023 | Joyce et al. | |
| 11,709,769 | B2 | 7/2023 | Pönitsch et al. | |
| 12,041,070 | B2 * | 7/2024 | Moshitzky | H04L 63/145 |
| 12,267,352 | B2 * | 4/2025 | Nikam | H04L 63/1466 |

(Continued)

FOREIGN PATENT DOCUMENTS

| | | |
|---|---|---|
| CN | 106295353 A | 1/2017 |
| CN | 111949536 B | 9/2023 |
| KR | 101614809 B1 | 4/2016 |

*Primary Examiner* — Samson B Lemma
(74) *Attorney, Agent, or Firm* — Ashurst Perkins Coie US LLP

(57) ABSTRACT

Systems, methods, and devices that relate to penetration testing using security agents are disclosed. In one example aspect, a system is caused to receive information of an API endpoint to be tested, select tools for testing the API endpoint, determine an order of execution of the tools, identify task agents suitable for testing the API endpoint, route the information of the API endpoint to the task agents, coordinate an execution time of the tools according to the order of execution, perform testing, using the task agents, of the API endpoint based on the coordination, validate testing results from the task agents, and provide a report for testing of the API endpoint.

17 Claims, 9 Drawing Sheets

(56) References Cited

U.S. PATENT DOCUMENTS

| | | | | |
|---|---|---|---|---|
| 12,430,227 | B1 * | 9/2025 | Badam | G06F 9/547 |
| 2012/0233589 | A1 | 9/2012 | Mruthyunjaya et al. | |
| 2022/0070279 | A1 * | 3/2022 | Pang | H04L 67/133 |
| 2022/0222335 | A1 * | 7/2022 | Bosch | G06F 21/57 |
| 2023/0004651 | A1 * | 1/2023 | Bosch | G06F 21/577 |
| 2023/0027403 | A1 | 1/2023 | Brown | |
| 2023/0027880 | A1 | 1/2023 | Brown | |
| 2023/0259632 | A1 * | 8/2023 | Marciano | G06F 21/554<br>726/25 |
| 2024/0036947 | A1 | 2/2024 | Ghattu et al. | |
| 2024/0054035 | A1 | 2/2024 | Bhargav | |
| 2024/0064167 | A1 * | 2/2024 | Nikam | H04L 67/02 |
| 2024/0176892 | A1 | 5/2024 | Mehta et al. | |
| 2024/0320425 | A1 | 9/2024 | Shek et al. | |
| 2024/0403437 | A1 * | 12/2024 | Szigeti | G06F 21/577 |
| 2024/0403444 | A1 * | 12/2024 | Jeevagunta | G06F 21/577 |
| 2025/0021657 | A1 * | 1/2025 | Andriukhin | G06F 21/577 |
| 2025/0165315 | A1 * | 5/2025 | Kostyulin | H04L 63/1433 |
| 2025/0377904 | A1 * | 12/2025 | Fedoruk | G06F 21/6209 |

* cited by examiner

PENETRATION TESTING OF APPLICATION PROGRAMMING INTERFACE ENDPOINTS USING SECURITY AGENTS

BACKGROUND

In the realm of cybersecurity, penetration testing is an important process employed to identify and mitigate vulnerabilities within systems. One notable type of vulnerability is the Insecure Direct Object Reference (IDOR), which is a type of vulnerability in cybersecurity in which an application provides direct access to objects based on user-supplied input without proper authorization checks. This can lead to unauthorized access to sensitive data. IDOR and other types of penetration testing enable identification and mitigation of security risks, ensuring the robustness and security of systems against potential attacks.

BRIEF DESCRIPTION OF THE DRAWINGS

Detailed descriptions of implementations of the present invention will be described and explained through the use of the accompanying drawings.

Figure 1:
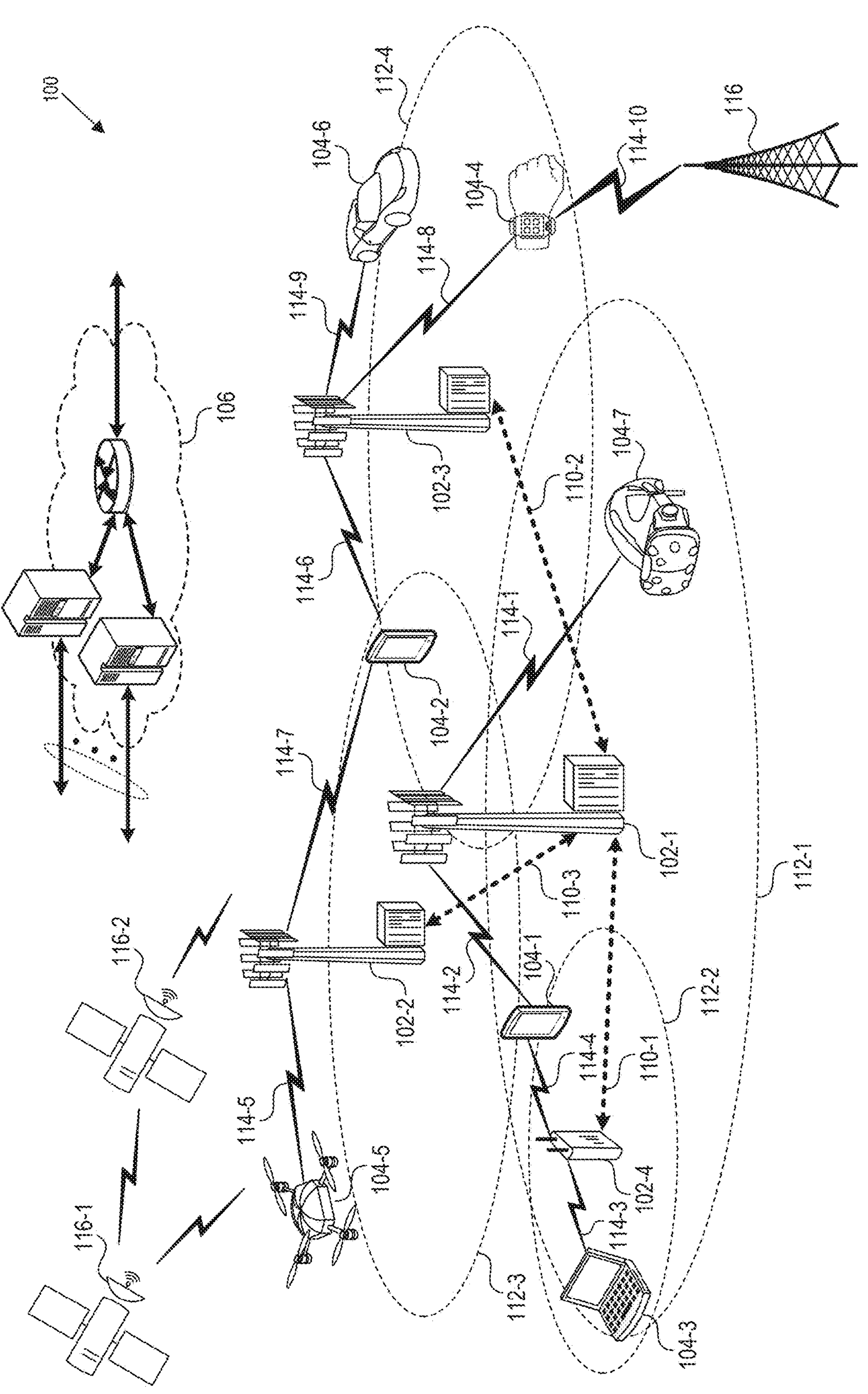
FIG. 1 is a block diagram that illustrates a wireless communications system that can implement aspects of the present technology.

The technologies described herein will become more apparent to those skilled in the art from studying the Detailed Description in conjunction with the drawings. Implementations or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In cybersecurity, penetration testing is a process for identifying vulnerabilities within systems. For example, IDOR is a type of vulnerability that poses significant risks by allowing unauthorized access to data through manipulated requests. Identifying IDOR vulnerabilities can prevent unauthorized users from accessing sensitive information, thereby protecting the integrity and confidentiality of the data. Traditionally, the approach to identifying IDOR vulnerabilities has been manual, involving meticulous examination of request and response patterns to detect potential security flaws. This manual process is not only time-consuming but also prone to human error, leading to inefficiencies and potential oversight of critical vulnerabilities. Once identified, these vulnerabilities are manually reviewed by engineers, further extending the process and increasing the risk of delayed responses to security threats. Thus, there is a need for more effective techniques for penetration testing of systems.

To address these challenges, this patent document discloses techniques that can be implemented to streamline penetration testing of application programming interface (API) endpoints. In particular, the disclosed techniques leverage multiple large language model (LLM) agents that are trained using data that simulates external attacks. This approach aims to improve, for example, the identification of IDOR vulnerabilities by orchestrating user input, tool selection, testing, and report generation. These techniques significantly reduce the time and effort required to identify vulnerabilities, enhancing both efficiency and accuracy.

The agents can be organized into groups or hierarchies and can operate in a series of stacked system prompts. In some implementations, the agent framework can feature a routing agent responsible for managing the overall process. This routing agent can receive instructions and prompts from a user, select tools for testing, determine an order of execution of the tools, identify various task agents for the testing, and route information to the various task agents. The task agents can coordinate execution times of the testing tools and perform testing of API endpoints. A supervisor agent can validate testing results, provide confidence scores, and provide reports for testing of API endpoints to the user. In some implementations, other types of agents can be combined to perform the penetration testing.

By streamlining the penetration testing process, this system addresses the inefficiencies and limitations of manual penetration testing. The use of multiple LLM agents, historical data integration, and a structured agent framework not only enhances the speed and accuracy of vulnerability identification but also provides a scalable and adaptable solution for various types of attack testing. Additionally, the integration of specialized LLM agents allows for continuous improvement and adaptation to emerging threats, ensuring that the security measures remain robust and up to date. This approach offers a more effective and efficient method for safeguarding systems against potential threats.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
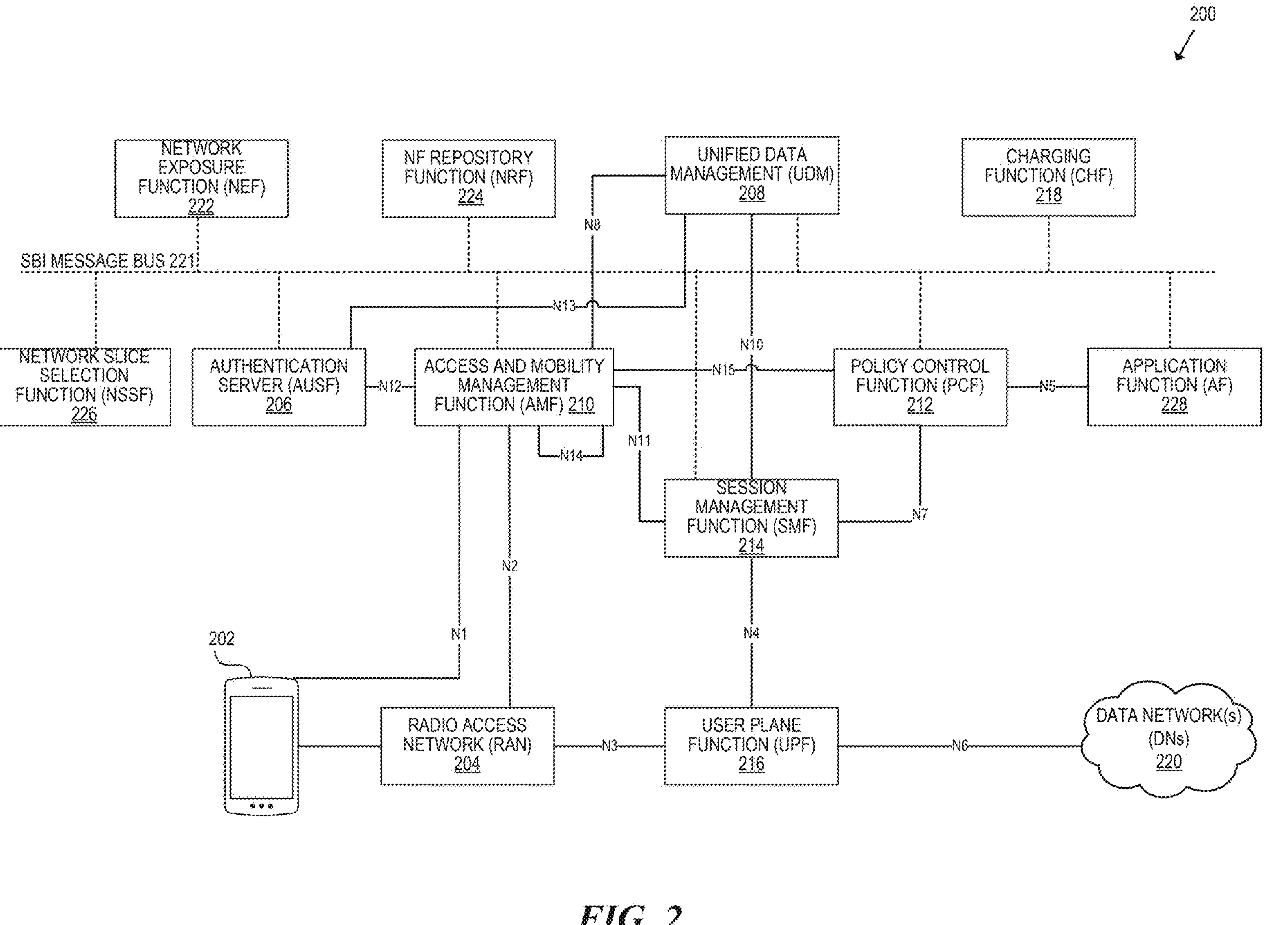
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Penetration Testing of API Endpoints Using Security Agents

In the penetration testing processes, the approach to identifying IDOR vulnerabilities has traditionally been manual, involving meticulous examination of request and response patterns to detect potential security flaws. This manual process is not only time-consuming but also prone to human error, leading to inefficiencies and potential oversight of critical vulnerabilities. Once identified, these vulnerabilities are manually reviewed by engineers, further elongating the process and increasing the risk of delayed responses to security threats. The disclosed techniques involve leveraging multiple LLM agents that are trained using data that simulates external attacks. This approach aims to improve, for example, the identification of IDOR vulnerabilities by orchestrating user input, tool selection, testing, and report generation. These techniques significantly reduce the time and effort required to identify vulnerabilities, enhancing both efficiency and accuracy.

Figure 3:
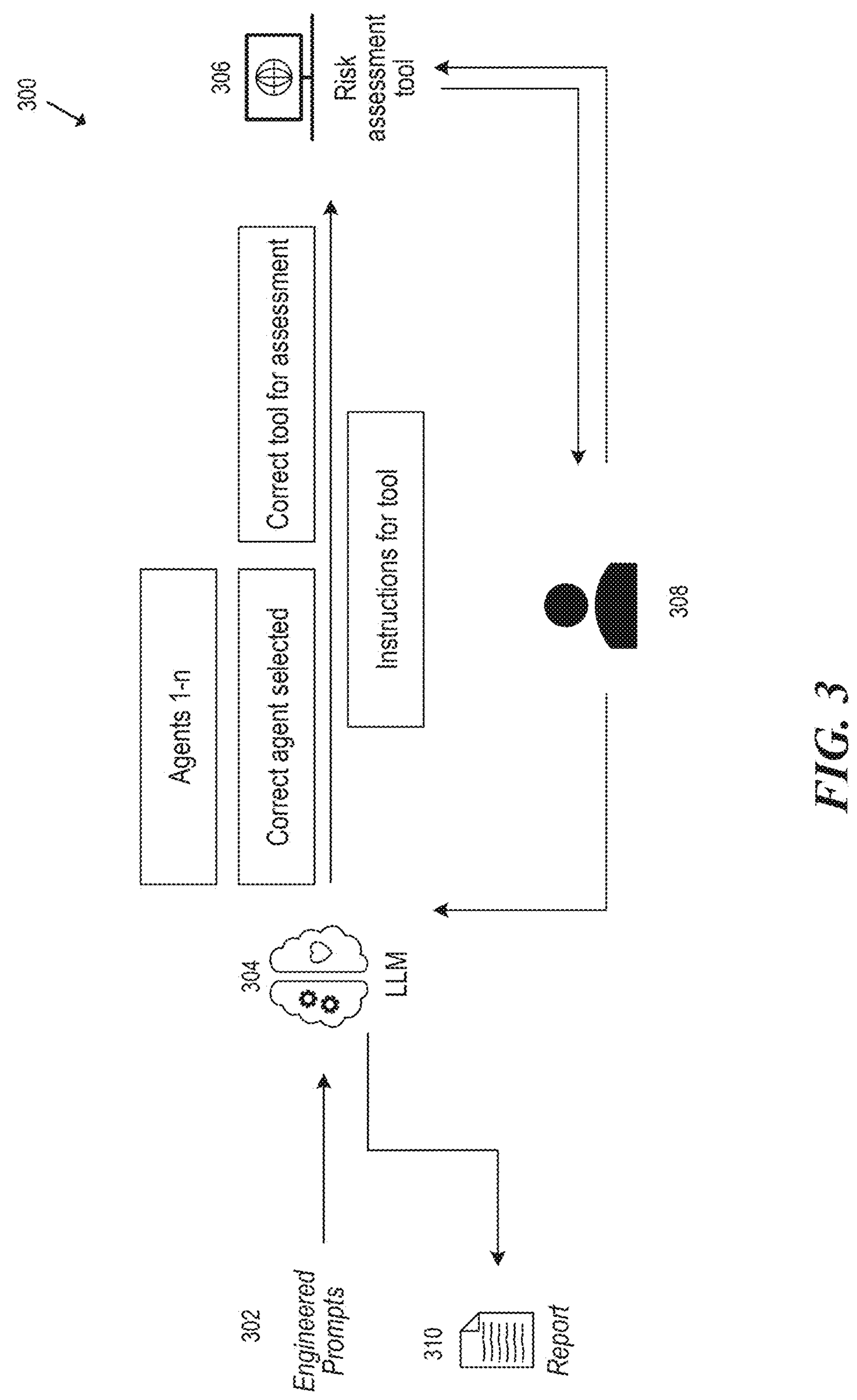
FIG. 3 is a flow diagram that illustrates aspects of the present technology.

FIG. 3 is a flow diagram 300 that illustrates aspects of the present technology. The flow diagram 300 can include engineered prompts 302 that are input into an LLM 304. In some implementations, the LLM 304 includes one or more agents trained for specific tasks. The LLM 304 can be trained using one or more of the methods discussed in relation to machine learning systems below. In some implementations, the engineered prompts 302 can include instructions for the penetration testing, information about an API endpoint to be tested, or other information. The LLM 304 can take the engineered prompts 302 as input and generate one or more outputs. For example, the LLM 304 can output agent identifiers for agents in a hierarchy of security agents. The LLM 304 can output agent identifiers for agents within the hierarchy that are suitable for running penetration testing on the API endpoint. In some implementations, the LLM 304 can output one or more tools for testing the API endpoint. In some implementations, the LLM 304 can output instructions for testing the API endpoint using the one or more tools. The flow diagram 300 can include one or more tools, including a risk assessment tool 306. The risk assessment tool 306 can receive one or more outputs from the LLM 304 as inputs. In some implementations, the risk assessment tool 306 can be responsible for assessing risks associated with one or more penetration tests. In some implementations, the risk assessment tool 306 can output testing results to a validator 308. For example, the validator 308 can be responsible for validating the testing results from the risk assessment tool 306. The validator 308 can provide feedback to the risk assessment tool 306. In some implementations, the validator 308 can provide information about the testing results to the LLM 304. In some implementations, the LLM 304 can output a report 310. For example, the report can include the testing results of the API endpoint. The LLM 304 can output the report 310 for consumption by a user.

The agents trained for penetration testing can be organized into groups or hierarchies and can operate in a series of stacked system prompts. In some implementations, the agent framework can feature a routing agent responsible for managing the overall process. This routing agent can receive instructions and prompts from a user, select tools for testing, determine an order of execution of the tools, identify various task agents for the testing, and route information to the various task agents. The task agents can coordinate execution times of the testing tools and perform testing of API endpoints. A supervisor agent can validate testing results, provide confidence scores, and provide reports for testing of API endpoints to the user. In some implementations, other types of agents can be combined to perform the penetration testing.

Figure 4A:
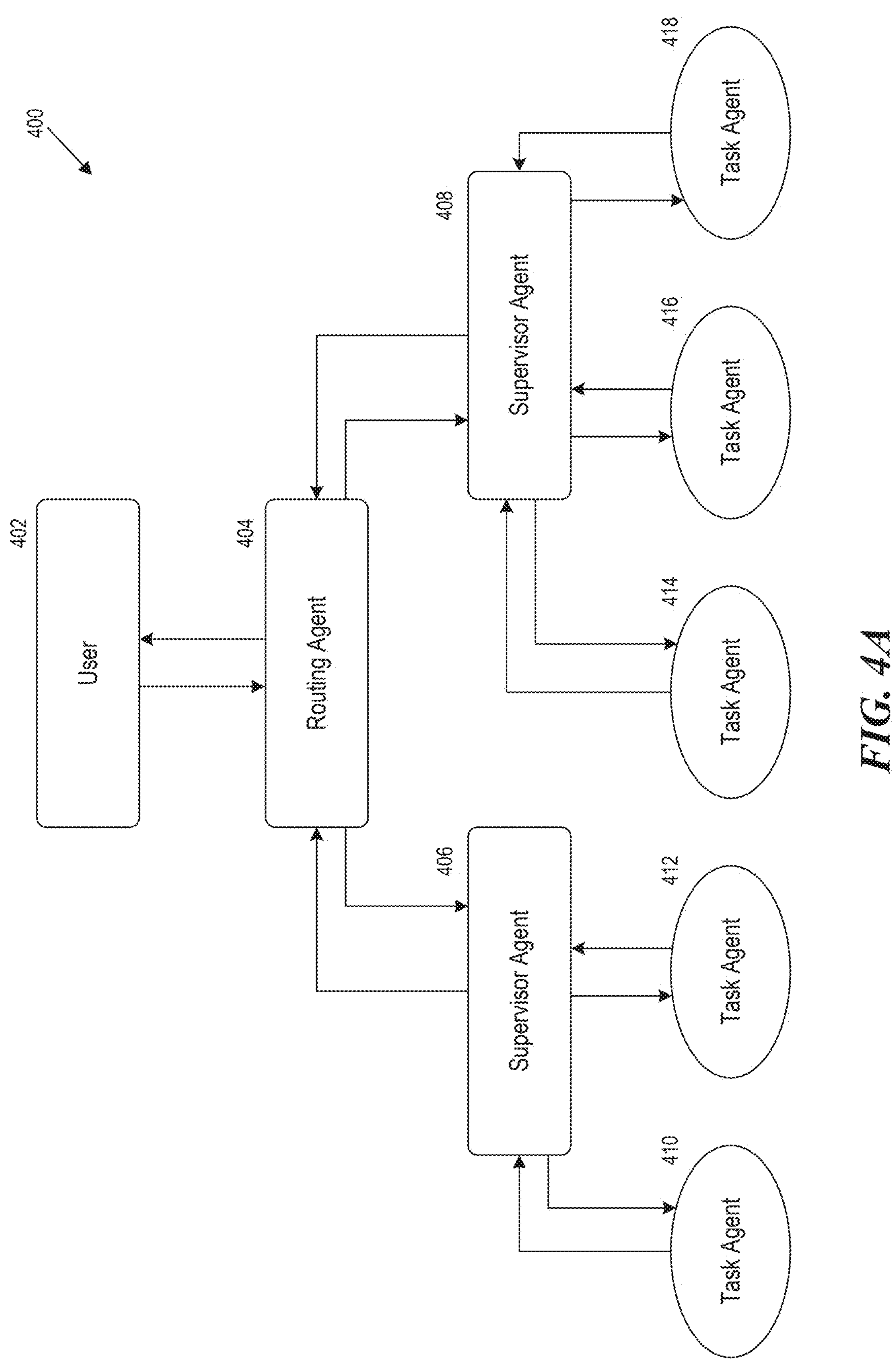
FIGS. 4A and 4B illustrate structures of agents implementing aspects of the present technology.

FIG. 4A illustrates a structure 400 of agents implementing aspects of the present technology. The structure 400 can be a hierarchy of agents, including tiers of agents with various roles. Agents can be LLMs that are specifically trained to perform distinct tasks, as discussed in greater detail below in relation to machine learning systems. For example, the user 402 can provide information, prompts, instructions, or other inputs. In some implementations, the user 402 can provide these inputs to a routing agent 404. In some implementations, the user 402 can receive information (e.g., testing results or reports) from the routing agent 404. The routing agent 404 can be responsible for determining the information to route to various agents. For example, as discussed in detail below, the routing agent 404 can select the tools for testing, determine an order of execution of the tools, identify task agents suitable for testing, and route information to the identified task agents. In some implementations, the routing agent 404 communicates directly with task agents. In some implementations, the routing agent 404 transmits information to various supervisor agents, which can relay the information to the task agents. For example, the routing agent 404 can communicate directly with a supervisor agent 406 and a supervisor agent 408.

In some implementations, supervisor agents oversee the task agents. As an illustrative example, the supervisor agent 406 can oversee task agents responsible for parameter manipulation (e.g., task agent 410 and task agent 412), ensuring that these agents are systematically altering object identifiers in API requests to detect unauthorized access. The supervisor agent 408 can manage task agents focused on access control verification (e.g., task agent 414, task agent 416, and task agent 418), making sure that these agents are testing different user roles and permissions to identify gaps in security protocols. Finally, the supervisor agent 406 and the supervisor agent 408 can validate testing results from the task agents and provide reports for the testing to the routing agent 404. By having this hierarchical structure, the routing agent 404 can efficiently distribute tasks and manage the workload, while the supervisor agents ensure the quality and accuracy of the testing process. This approach, in turn, allows the task agents to focus on specific responsibilities.

Figure 4B:
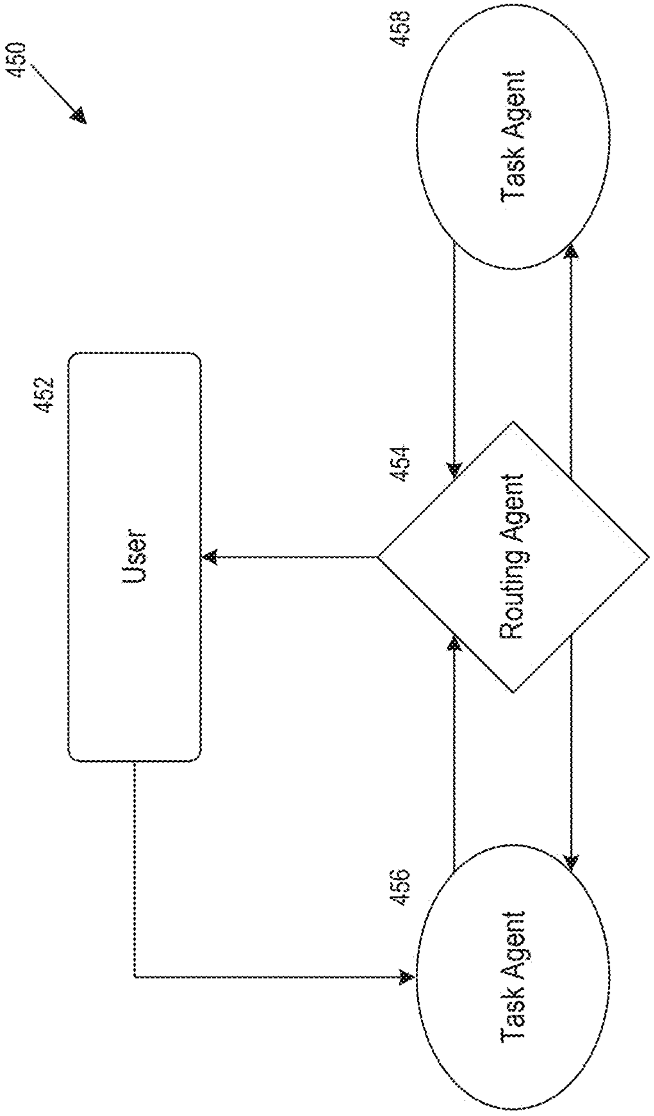

FIG. 4B illustrates a structure 450 of agents implementing aspects of the present technology. In some implementations, the user 452 can additionally act as a supervisor (e.g., performing any of the processes discussed in relation to the supervisor agents shown in FIG. 4A). The user 452 can provide information, prompts, instructions, or other inputs. In some implementations, the user 452 can provide these inputs directly to a task agent 456. In some implementations, the user 452 can receive information (e.g., testing results or reports) from the routing agent 454. The routing agent 454 can oversee the task agents (e.g., the task agent 456 and a task agent 458). The task agent 456 can be responsible for automated scanning of an application to identify endpoints that are susceptible to IDOR vulnerabilities. For example, the task agent 456 can systematically scan the application's structure, mapping out the endpoints and identifying potential weak points where object identifiers are used. Meanwhile, the task agent 458 can focus on response analysis, examining a server's responses to various requests to detect unintended data exposure. The task agent 458 can look for sensitive information in error messages or unexpected data in successful responses, ensuring that no confidential information is inadvertently leaked. The routing agent 454 can validate testing results from the task agents and provide reports for the testing to the user. By using the structure 450, the routing agent 454 can oversee the task agents performing various tasks, while the task agents focus on specific responsibilities.

In some implementations, a routing agent (e.g., LLM 304, as shown in FIG. 3, routing agent 404, as shown in FIG. 4A, or routing agent 454, as shown in FIG. 4B) is configured to handle specific tasks related to API endpoint testing. For example, the routing agent can be configured to receive, from a user, information about an API endpoint to be tested. For example, as shown in FIG. 3, the LLM 304 can receive engineered prompts 302. As shown in FIG. 4A, the user 402 and the routing agent 404 can exchange information directly, including information about the API endpoint. As shown in FIG. 4B, the routing agent 454 can receive information indirectly from the user 452 (e.g., via the task agent 456). In some implementations, another method of receiving information from the user can be used.

In some implementations, the information about the API endpoint can include a type of the API endpoint. The type of an API endpoint can affect the nature and functionality of the API. Examples of API endpoint types include RESTful APIs, SOAP APIs, GraphQL APIs, and WebSocket APIs. Each type can have distinct characteristics and use cases. For instance, RESTful APIs can be used for web services and applications. SOAP APIs can be used in enterprise-level applications. GraphQL APIs can be used in complex data environments. WebSocket APIs enable real-time communication and can be used for applications requiring instant data updates, such as chat applications or live sports scores. Different API types can have unique protocols, data formats, and interaction patterns, which require specific testing approaches to ensure their functionality, performance, and security. For example, testing a RESTful API can focus on HTTP methods and status codes, while testing a WebSocket API can involve checking the real-time data transmission and connection stability.

In some implementations, the information about the API endpoint includes historical vulnerabilities of the API endpoint. In some implementations, the information includes historical actions, release notes, or other information about the API endpoint. Historical vulnerabilities highlight past security issues that have been identified and addressed, offering insights into potential recurring problems or areas that require more rigorous testing. Historical actions, such as previous testing results, bug fixes, and updates, help in tracking the API's development and maintenance history. Release notes can provide detailed information about new features, improvements, and bug fixes introduced in each version of the API, which can highlight changes that potentially impact its functionality or security. By incorporating this extensive information, the routing agent can make more informed decisions when selecting testing tools and strategies.

The routing agent can be configured to select one or more tools for testing the API endpoint. For example, the routing agent can choose the appropriate tools based on the type of the API endpoint, such as RESTful, SOAP, GraphQL, or WebSocket, each of which requires different testing methodologies and tools. In some implementations, the routing agent can make its selection based on other information, such as historical vulnerabilities associated with the API endpoint. By taking into account these past security issues, the routing agent can prioritize tools that are specifically designed to detect similar vulnerabilities.

The routing agent can be configured to determine an order of execution of the one or more tools based on the information of the API endpoint. For example, the routing agent can specify the sequence in which the tools should be run. In some implementations, the routing agent determines whether a subset of the tools should be executed in parallel, which can reduce the overall testing time and increase efficiency. By analyzing information such as the type of the API endpoint and historical vulnerabilities, the routing agent can strategically order the execution to prioritize critical tests first or to run complementary tests simultaneously. This approach can ensure that the most relevant and impactful tests are conducted promptly, while also leveraging parallel execution to expedite the process.

The routing agent can be configured to identify one or more task agents suitable for testing the API endpoint. In some implementations, the task agents can be LLMs that are specifically trained to perform distinct tasks, as discussed in greater detail below in relation to machine learning systems. In some implementations, the task agents correspond to task agent 410, task agent 412, task agent 414, task agent 416, and task agent 418, as shown in FIG. 4A. in some implementations, the task agents correspond to task agent 456 and task agent 458, as shown in FIG. 4B. Each of the one or more task agents can be trained to test endpoints using at least one of the selected one or more tools. For example, a task agent can be trained to use a security testing tool to identify vulnerabilities in an API's authentication mechanisms or to employ a performance testing tool to assess the API's response times and scalability. As an example, a task agent can correspond to an LLM trained to use the risk assessment tool 306, for example, as shown in FIG. 3.

In some implementations, the routing agent can select the one or more task agents from a hierarchy of security agents. As an example, FIG. 4A is illustrative of a hierarchy of agents. The routing agent can select (e.g., from among task agent 410, task agent 412, task agent 414, task agent 416, and task agent 418) which task agents are suitable for testing the API endpoint. The routing agent can identify the task agents suitable for testing the API endpoint based on, for example, the information of the API endpoint and the selected one or more tools. This can involve matching the specific requirements and characteristics of the API with the capabilities of various task agents. Different task agents can be employed to target specific types of vulnerabilities, leveraging their specialized capabilities to carry out different forms of testing. For example, a task agent configured with Burp Suite can be used to identify and exploit web application vulnerabilities such as IDORs. In some implementations, if the API endpoint is a RESTful API with known historical vulnerabilities related to authentication, the routing agent can select task agents specialized in tools for security testing and authentication protocols. As an illustrative example, the routing agent 404 can identify the task agent 410 and the task agent 412 as suitable for testing the API endpoint.

The routing agent can be configured to route the information of the API endpoint to the one or more task agents. In some implementations, the routing agent routes the information directly to the task agents, as shown in FIG. 4B. In some implementations, the routing agent routes the information to the task agents via supervisor agents, as shown in FIG. 4A. The information about the API endpoint enables the task agents to tailor testing strategies to the specific characteristics and needs of the API endpoint. For example, if the API has a history of security issues, the task agents can prioritize security testing and focus on areas that have previously been problematic. In some implementations, the routing agent can route instructions for applying tests to the API endpoint. For example, the routing agent can send specific directives to the task agents on how to execute certain tests, such as the sequence in which tests should be performed, the parameters to be used, and any particular focus areas based on the API's historical vulnerabilities. These instructions can include detailed steps for conducting security assessments, performance evaluations, and functionality checks.

The routing agent can be configured to route the information of the API endpoint to the one or more task agents based on load balancing the testing of the API endpoint across the one or more task agents. This load balancing can ensure that the testing workload is evenly distributed among the available task agents, preventing a single agent from becoming a bottleneck. This can enhance the overall efficiency of the testing process. By analyzing the current workload and capacity of each task agent, the routing agent can dynamically allocate tasks in a manner that optimizes resource utilization and minimizes testing time. For example, if one task agent is already heavily loaded with performance testing tasks, the routing agent can assign security testing tasks to another, less busy task agent. This balanced distribution not only accelerates the testing process but also ensures that each aspect of the API is thoroughly tested without overburdening any single task agent.

The routing agent can be configured to determine schedules or triggers for performing the testing of the API endpoint. For example, a scheduling capability can allow the routing agent to set specific times for routine tests, such as nightly builds or weekly security scans, such that the API is regularly evaluated for performance, security, and functionality. Additionally, the routing agent can define various triggers that initiate tests in response to specific events or conditions, providing a more dynamic and responsive testing process. For example, the routing agent can trigger tests immediately following a new code deployment to ensure that recent changes have not introduced any new issues. Similarly, if a critical vulnerability is detected in the API, the routing agent can automatically initiate a series of security tests to assess the extent of the vulnerability and verify that it has been effectively mitigated. Other triggers can include significant changes in API usage patterns, such as a sudden spike in traffic, which can prompt performance tests to ensure the API can handle the increased load.

In some implementations, the task agents identified by the routing are configured to coordinate an execution time of the tools according to an order of execution. For example, as previously discussed, the routing agent can determine a sequence in which the tools should be run. The task agents can then perform testing based on this sequence. In some implementations, the routing agent can determine that a subset of the tools is to be executed in parallel. The task agents can coordinate execution of that subset of tools in parallel. As an illustrative example, the task agents can coordinate to execute security testing tools to identify and address any critical vulnerabilities before proceeding with performance testing tools to evaluate the API's responsiveness and scalability. As such, the task agents can coordinate so that each phase of testing builds upon the results of the previous phase. To achieve this coordination, the task agents can communicate and synchronize their activities. For example, the coordination can ensure that each tool is executed at the appropriate time and that the results are systematically collected and analyzed. This can involve setting specific time windows for each tool's execution, monitoring the progress of ongoing tests, and dynamically adjusting the schedule based on real-time feedback and results.

The task agents can be configured to perform testing of the API endpoint based on the coordination. In some implementations, testing of the API endpoint can be performed using the one or more task agents. In some implementations, the testing can be performed based on the coordination. For example, one task agent can be responsible for conducting security tests to identify vulnerabilities and potential threats, while another task agent focuses on performance testing to evaluate the API's response times and scalability under different load conditions. A third task agent can handle functionality testing to ensure that the API behaves as expected and meets specified requirements. By coordinating these efforts, the task agents can work in parallel, reducing the overall time required for comprehensive testing and ensuring that critical aspects of the API are thoroughly examined. Furthermore, the coordination can allow for dynamic adjustments based on real-time feedback and results. If a security test identifies a critical vulnerability, the task agents can prioritize additional security tests or reallocate resources to address the issue promptly. Similarly, if performance tests reveal bottlenecks, the task agents can attempt to optimize the API's performance.

In some implementations, the one or more task agents are configured to perform the testing of the API endpoint based on the one or more triggers identified by the routing agent. These triggers can be predefined events or conditions that signal the need for specific tests to be conducted. For example, a trigger can be the deployment of new code, which prompts the task agents to initiate a series of regression tests to ensure that the new changes have not introduced any bugs or issues. Another trigger can be a detected security vulnerability, which can lead to immediate security testing to assess the impact and verify the effectiveness of any applied fixes. If the routing agent detects a significant increase in API traffic, it can trigger performance tests to evaluate how well the API handles the increased load. The task agents can then execute these tests, providing valuable insights into the API's scalability and identifying any potential performance bottlenecks. Similarly, if a new feature is added to the API, the routing agent can trigger functionality tests to ensure that the new feature works as intended and does not interfere with existing functionality.

In some implementations, a supervisor agent can perform aspects of the disclosed technology. The supervisor agent can correspond to the validator 308 shown in FIG. 3. In some implementations, the supervisor agent corresponds to the supervisor agent 406 or the supervisor agent 408, as shown in FIG. 4A. In some implementations, steps discussed in relation to a supervisor agent can be performed by any agent, such as the LLM 304, as shown in FIG. 3, or the user 452 or the routing agent 454, as shown in FIG. 4B.

The supervisor agent can validate testing results from the one or more task agents. The validation can involve a review and analysis of data collected by the task agents during testing activities. The supervisor agent can cross-check the results against predefined criteria and benchmarks to confirm that the tests have been executed correctly and that the outcomes are consistent with expected performance and security standards. For example, if a task agent reports that the API passed a series of security tests, the supervisor agent can verify that necessary tests were conducted and that the results meet the required security thresholds. Additionally, the supervisor agent can identify discrepancies or anomalies in the testing data, prompting further investigation or re-testing if necessary.

The supervisor agent can be configured to provide, based on the validated testing results, a report for testing of the API endpoint for a user. For example, as shown in FIG. 3, the LLM 304 can output the report 310. As shown in FIG. 4A, the supervisor agent 406 or the supervisor agent 408 can provide outputs, such as a report for testing of the API, to the routing agent 404. The routing agent 404 can then provide the report to the user 402. As shown in FIG. 4B, the routing agent 454 can provide information, such as a report for testing of the API, directly to the user 452. The report can consolidate the findings from the various task agents, presenting a clear and detailed overview of the API's performance, functionality, and security. The report can include summaries of each test conducted, highlighting key metrics, outcomes, and any identified issues or vulnerabilities.

The report can provide actionable insights and recommendations for addressing detected problems. Recommendations can include, for example, specific code changes to fix identified bugs, enhancements to improve performance, or security patches to address vulnerabilities. In some implementations, the report indicates at least one update required for the API endpoint based on the testing of the API endpoint. The report can also prioritize these updates based on their severity and impact, helping users to focus on the most critical issues first. Additionally, the report can suggest best practices for future development and testing, such as implementing automated testing frameworks, adopting more robust security measures, or optimizing the API's architecture for better scalability. The report can additionally indicate one or more vulnerabilities of the API endpoint discovered through the testing and at least one tool, of the one or more tools, used to discover the one or more vulnerabilities. For example, the report can highlight a SQL injection vulnerability detected by a specific security scanning tool or an authentication flaw discovered by a penetration testing tool.

The supervisor agent can generate one or more confidence scores associated with the validated testing results. For example, the confidence scores can indicate a likelihood that the validated testing results are accurate. For example, a high confidence score can indicate a strong likelihood that the validated testing results are accurate and that the API endpoint has been thoroughly tested without any significant issues being overlooked. Conversely, a lower confidence score can suggest that there are areas of uncertainty or potential gaps in the testing process that warrant further investigation. These confidence scores can be derived from various factors, such as the comprehensiveness of the tests conducted, the consistency of the results across different testing tools, and the historical performance of the API in similar testing scenarios. For example, if multiple task agents using different tools consistently report the same results, the confidence score can be higher, reflecting the increased reliability of the findings. On the other hand, if there are discrepancies or anomalies in the results, the confidence score can be lower, indicating the need for further scrutiny. The supervisor agent can provide the confidence scores with the report for the testing of the API endpoint.

The disclosed techniques can be performed in conjunction with various internal and external systems for processing data, performing testing, and ensuring comprehensive validation of the API endpoint, as discussed below in relation to FIG. 5. Internally, the disclosed techniques can rely on testing infrastructure within a system. Externally, the disclosed techniques can interface with a wide range of third-party tools and services that specialize in different aspects of API testing and security. By incorporating these external systems, the disclosed techniques can benefit from specialized expertise and advanced capabilities that enhance the overall testing process. This integration allows for a more thorough and diverse assessment of the API, covering multiple dimensions of performance, functionality, and security.

Figure 5:
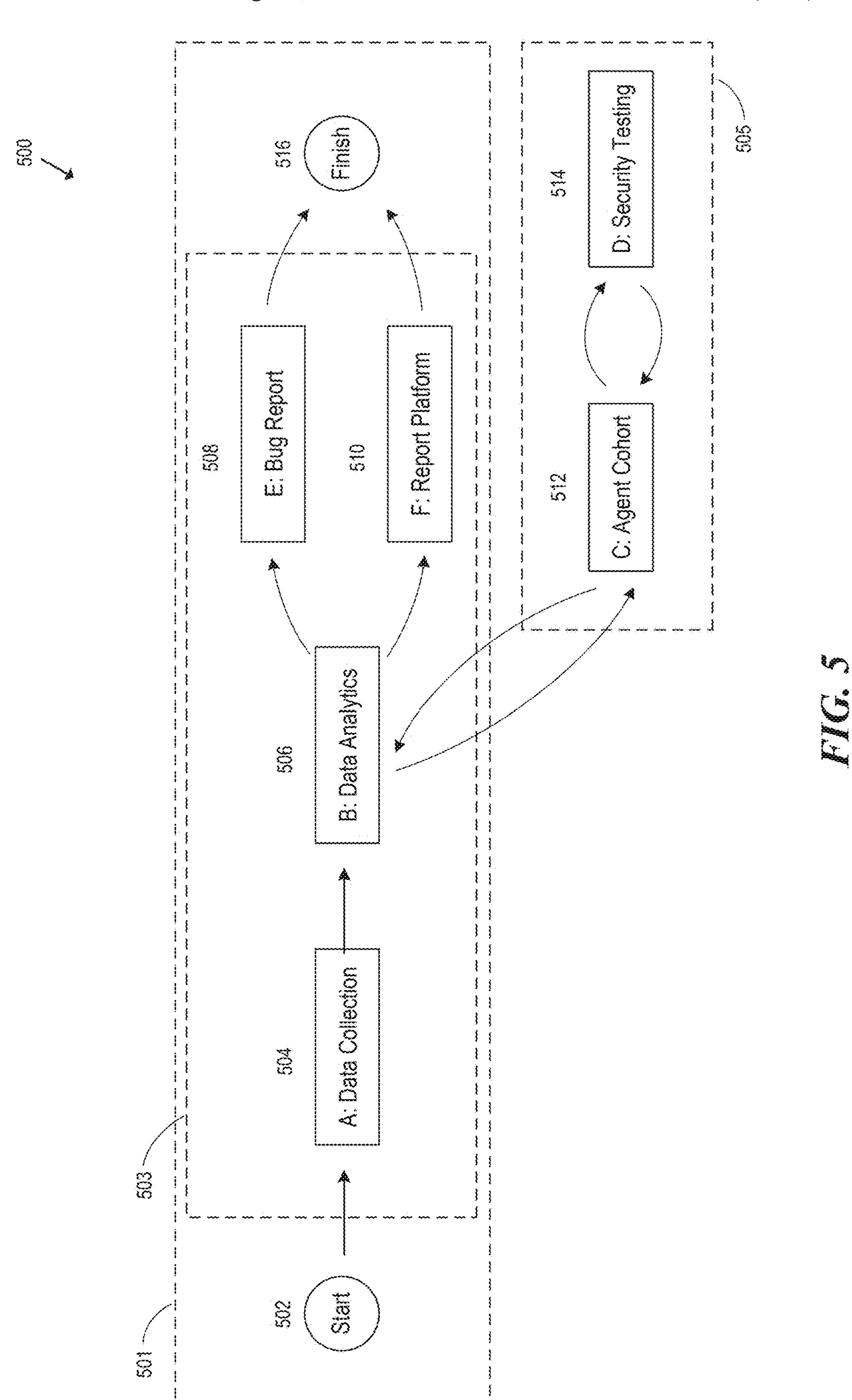
FIG. 5 is a flow diagram that illustrates aspects of the present technology.

FIG. 5 is a flow diagram 500 that illustrates aspects of the present technology. In some implementations, the flow diagram 500 represents an illustrative process of the present technology. In some implementations, a subset 501 of the flow diagram 500 can be performed using internal systems. For example, a subset 503 of processes can be performed using an internal platform that can programmatically author, schedule, and monitor workflows. The platform can be designed to manage complex computational workflows and data processing pipelines. In some implementations, the subset 505 can be performed using external systems or off network. For example, the subset 505 can include processes that are performed without direct network connectivity for security, compliance, or other reasons. In some implementations, other configurations of the flow diagram 500 can be used.

The flow diagram begins at the start 502. From the start 502, the flow proceeds to Data Collection 504. This step can involve gathering and organizing the data that will be subjected to further analysis and testing. For example, Splunk can collect logs and metrics from various sources, providing a comprehensive dataset for subsequent testing phases. Historic data obtained from Data Collection 504 (e.g., historic tests) can be used to supplement testing. From Data Collection 504, the flow diagram 500 moves to Data Analytics 506. Data Analytics 506 can serve as a unified data analytics platform, aiding in the processing and analysis of large datasets. This step can ensure that the data is prepared and transformed into a format suitable for detailed examination and testing, such as aggregating log data to identify patterns or anomalies that can indicate potential security issues.

The flow diagram 500 illustrates a bidirectional flow between Data Analytics 506 and the Agent Cohort 512. The data processed by Data Analytics 506 can be provided to the Agent Cohort 512. In some implementations, Data Analytics 506 can provide knowledge graphs for the Agent Cohort 512 to refer to. The Agent Cohort 512 can include various task agents responsible for different aspects of the testing process, such as performance testing, functional testing, and security testing. For instance, a task agent can use a tool for performance testing to simulate high traffic loads and measure the API's response times, while another agent can use another tool for functional testing to ensure that the API behaves as expected under different conditions. The Agent Cohort 512 can be on or off network. Off network virtual machines can be less secure but can allow for testing of unauthenticated users. In some implementations, Data Analytics 506 can send limited instructions to off network agents and can encrypt transmissions.

Similarly, there is a bidirectional flow between the Agent Cohort 512 and Security Testing 514. For example, the Agent Cohort 512 and Security Testing 514 can iterate through the vulnerabilities of an API endpoint. Security Testing 514 is used for web application security testing and can include IDOR tests. The flow between the Agent Cohort 512 and Security Testing 514 can signify an ongoing security analysis or vulnerability assessment conducted on the data or processes managed by the Agent Cohort 512. For example, Security Testing 514 can be used to perform penetration testing, identifying vulnerabilities such as SQL injection or cross-site scripting (XSS) in the API. The results of these tests are fed back into the Agent Cohort 512, which can then take corrective actions or further refine the testing process.

The flow from Data Analytics 506 branches out to two separate paths. One path leads to a Bug Report 508. The data processed by Data Analytics 506 can be subjected to external scrutiny through bug programs, providing an additional layer of security testing and validation. For example, external security researchers can use various tools and techniques to discover vulnerabilities that were not identified during internal testing, and their findings can be documented in the Bug Report 508. The Bug Report 508 can include what vulnerabilities were identified and the tools used to identify said vulnerabilities. The other path from Data Analytics 506 leads to a Report Platform 510. The Report Platform is a business analytics service that provides interactive visualizations and business intelligence capabilities. This path can represent the generation of analytical reports or dashboards based on the data processed by Data Analytics 506, offering insights into the performance and security of the API endpoint. For instance, the Report Platform can visualize the results of tests, showing trends in response times and identifying potential bottlenecks.

Finally, both the Bug Report 508 and the Report Platform 510 converge to a Finish 516. This represents the successful generation of reports and the resolution of any identified issues. The Bug Report 508 can ensure that any security vulnerabilities discovered through external testing are addressed, while the Report Platform 510 can provide a comprehensive overview of the API's performance and security status. Together, these reports ensure that the API endpoint is thoroughly tested, validated, and ready for deployment, meeting the highest standards of quality and reliability.

Figure 6:
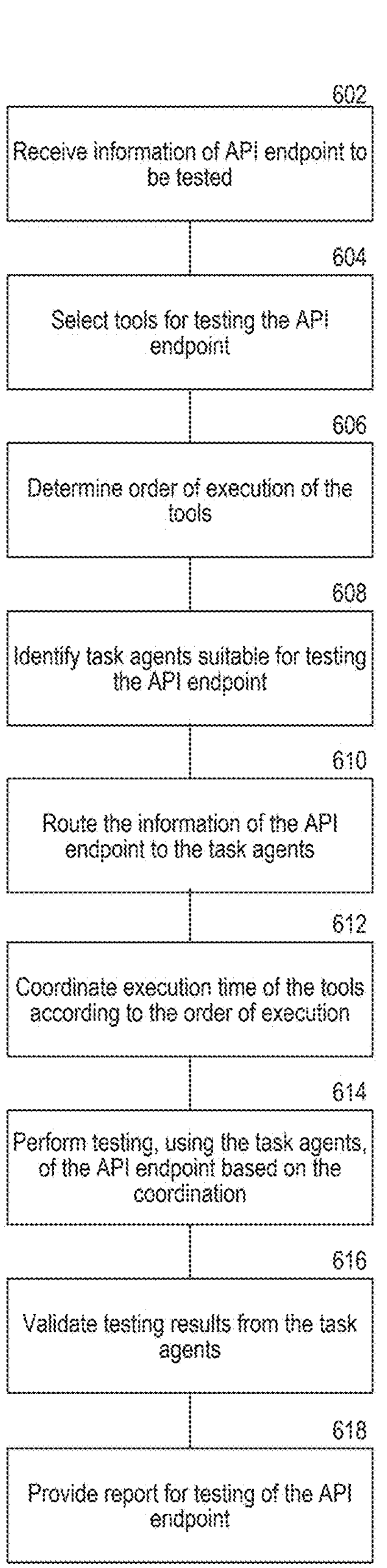
FIG. 6 is a flow diagram that illustrates a method of the present technology.

FIG. 6 is a flow diagram that illustrates a method of the present technology. The method 600 includes receiving, at operation 602, information of an API endpoint to be tested. This information can include details about the type of API endpoint to be tested, historic vulnerabilities of the API endpoint, and other information. The method 600 includes selecting, at operation 604, tools for testing the API endpoint. These tools can include performance testing tools, security testing tools, and functional testing tools. The method 600 includes determining, at operation 606, an order of execution of the tools. This order can be based on the testing strategy, such as performing security tests before performance tests to ensure vulnerabilities are addressed early. The order can specify that certain tests are to be performed in parallel. The method 600 includes identifying, at operation 608, task agents suitable for testing the API endpoint. Task agents can be specialized for different types of tests, such as agents configured to handle load testing, security scanning, or functional validation. The method 600 includes routing, at operation 610, the information of the API endpoint to the task agents. This involves distributing the API endpoint details to the appropriate task agents along with instructions or other information. The method 600 includes coordinating, at operation 612, an execution time of the tools according to the order of execution. This coordination ensures that the tests are run in the correct sequence or in parallel. The method 600 includes, at operation 614, performing testing, using the task agents, of the API endpoint based on the coordination. The task agents can execute their respective tests using the respective tools. The method 600 includes validating, at operation 616, testing results from the task agents. Validation can involve checking the results for accuracy, consistency, and completeness and ensuring that any issues are investigated and resolved. The method 600 includes providing, at operation 618, a report for testing of the API endpoint. This report can summarize the findings from the tests, highlighting any issues discovered and providing recommendations for remediation.

Machine Learning Systems

Implementing the techniques disclosed herein can involve several specialized agents, as discussed above. For example, various agents can be responsible for performing the tasks discussed above in relation to FIG. 3, FIG. 4A, and FIG. 4B. Agents can be LLMs that are specifically trained to perform distinct tasks. These LLMs can leverage vast amounts of data and advanced machine learning techniques to handle a wide range of tasks associated with penetration testing. When trained for specific tasks, such as penetration testing, these LLM agents can use training data that simulates external attacks, analyze system responses, and identify potential vulnerabilities with high precision. For example, an LLM agent trained for API endpoint testing can craft and send malicious requests to probe for security weaknesses. Another LLM agent can be specialized in analyzing authentication protocols to detect flaws in user verification processes.

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer") and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks, and there can be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions), for example, as compared with models with fewer layers. In the present disclosure, the term “ML-based model” or more simply “ML model” can be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset can be a collection of text documents, referred to as a text corpus (or simply referred to as a corpus). The corpus can represent a language domain (e.g., a single language), a subject domain (e.g., scientific papers), and/or can encompass another domain or domains, be they larger or smaller than a single language or subject domain. For example, a relatively large, multilingual and non-subject-specific corpus can be created by extracting text from online webpages and/or publicly available social media posts. Training data can be annotated with ground truth labels (e.g., each data entry in the training dataset can be paired with a label), or can be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters can be adjusted so as to lower the output value in future training iterations. An objective function is a way to quantitatively represent how close the output value is to the target value. An objective function represents a quantity (or one or more quantities) to be optimized (e.g., to minimize a loss or maximize a reward) in order to bring the output value as close to the target value as possible. The goal of training the ML model typically is to minimize a loss function or maximize a reward function.

The training data can be a subset of a larger data set. For example, a data set can be split into three mutually exclusive subsets: a training set, a validation (or cross-validation) set, and a testing set. The three subsets of data can be used sequentially during ML model training. For example, the training set can be first used to train one or more ML models, each ML model, e.g., having a particular architecture, having a particular training procedure, being describable by a set of model hyperparameters, and/or otherwise being varied from the other of the one or more ML models. The validation (or cross-validation) set can then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (i.e., with the training set) can begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) can begin. The output generated from the testing set can be compared with the corresponding desired target values to give a final assessment of the trained ML model’s accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., “learn”) the parameters to reduce the loss function. Backpropagation is performed iteratively so that the loss function is converged or minimized. Other techniques for learning the parameters of the ML model can be used. The process of updating (or learning) the parameters over many iterations is referred to as training. Training can be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model can be deployed to generate output in real-world applications (also referred to as “inference”).

In some examples, a trained ML model can be fine-tuned, meaning that the values of the learned parameters can be adjusted slightly in order for the ML model to better model a specific task. Fine-tuning of an ML model typically involves further training the ML model on a number of data samples (which can be smaller in number/cardinality than those used to train the model initially) that closely target the specific task. For example, an ML model for generating natural language that has been trained generically on publically-available text corpora can be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It can be noted that, while the term “language model” has been commonly used to refer to a ML-based language model, there can exist non-ML language models. In the present disclosure, the term “language model” can be used as shorthand for an ML-based language model (i.e., a language model that is implemented using a neural network or other ML architecture), unless stated otherwise. For example, unless stated otherwise, the “language model” encompasses LLMs.

A language model can use a neural network (typically a DNN) to perform natural language processing (NLP) tasks. A language model can be trained to model how words relate to each other in a textual sequence, based on probabilities. A language model can contain hundreds of thousands of learned parameters or in the case of an LLM can contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture referred to as a transformer for use as a language model. For example, the Bidirectional Encoder Representations from Transformers (BERT), the Transformer-XL, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure can be applicable to any ML-based language model, including language models based on other neural network architectures such as RNN-based language models.

Figure 7:
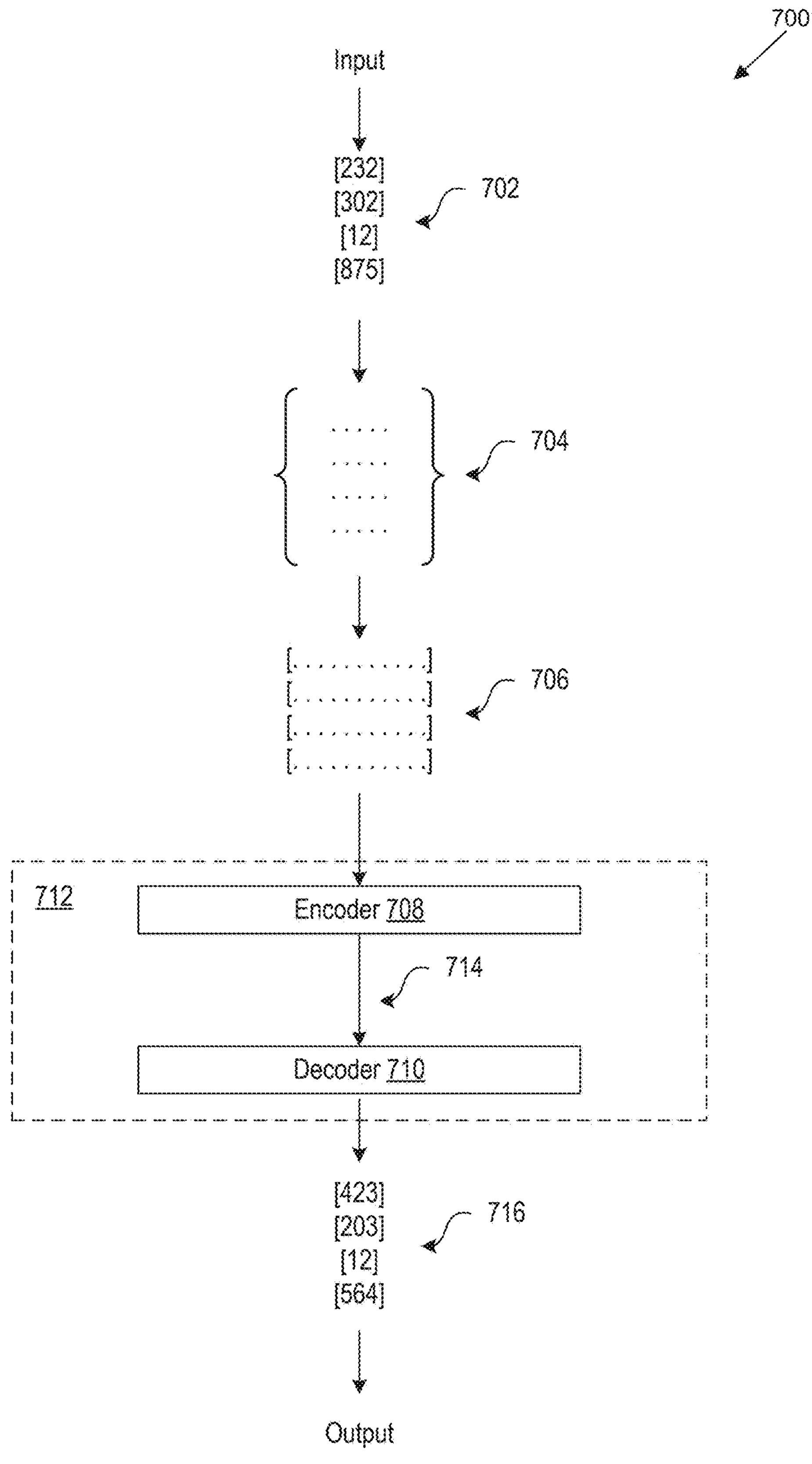
FIG. 7 is a block diagram of an example transformer.

FIG. 7 is a block diagram 700 of an example transformer 712. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure can be applicable to any ML-based language model, including language models based on other neural network architectures such as RNN-based language models.

The transformer 712 includes an encoder 708 (which can comprise one or more encoder layers/blocks connected in series) and a decoder 710 (which can comprise one or more decoder layers/blocks connected in series). Generally, the encoder 708 and the decoder 710 each include a plurality of neural network layers, at least one of which can be a self-attention layer. The parameters of the neural network layers can be referred to as the parameters of the language model.

The transformer 712 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that can be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 712 is trained to perform certain functions on other input formats than natural language input. For example, the input can include objects, images, audio content, or video content, or a combination thereof.

The transformer 712 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 7 illustrates an example of how the transformer 712 can process textual input data. Input to a language model (whether transformer-based or otherwise) typically is in the form of natural language that can be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 7, a short sequence of tokens 702 corresponding to the input text is illustrated as input to the transformer 712. Tokenization of the text sequence into the tokens 702 can be performed by some pre-processing tokenization modules such as, for example, a byte-pair encoding tokenizer (the "pre" referring to the tokenization occurring prior to the processing of the tokenized input by the LLM), which is not shown in FIG. 7 for simplicity. In general, the token sequence that is inputted to the transformer 712 can be of any length up to a maximum length defined based on the dimensions of the transformer 712. Each token 702 in the token sequence is converted into an embedding vector 706 (also referred to simply as an embedding 706). An embedding 706 is a learned numerical representation (such as, for example, a vector) of a token that captures some semantic meaning of the text segment represented by the token 702. The embedding 706 represents the text segment corresponding to the token 702 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 706 corresponding to the "write" token will be closer to another embedding corresponding to the "jot down" token in the vector space as compared to the distance between the embedding 706 corresponding to the "write" token and another embedding corresponding to the "summary" token.

The vector space can be defined by the dimensions and values of the embedding vectors. Various techniques can be used to convert a token 702 to an embedding 706. For example, another trained ML model can be used to convert the token 702 into an embedding 706. In particular, another trained ML model can be used to convert the token 702 into an embedding 706 in a way that encodes additional information into the embedding 706 (e.g., a trained ML model can encode positional information about the position of the token 702 in the text sequence into the embedding 706). In some examples, the numerical value of the token 702 can be used to look up the corresponding embedding in an embedding matrix 704 (which can be learned during training of the transformer 712).

The generated embeddings 706 are input into the encoder 708. The encoder 708 serves to encode the embeddings 706 into feature vectors 714 that represent the latent features of the embeddings 706. The encoder 708 can encode positional information (i.e., information about the sequence of the input) in the feature vectors 714. The feature vectors 714 can have very high dimensionality (e.g., on the order of thousands or tens of thousands), with each element in a feature vector 714 corresponding to a respective feature. The numerical weight of each element in a feature vector 714 represents the importance of the corresponding feature. The space of possible feature vectors 714 that can be generated by the encoder 708 can be referred to as the latent space or feature space.

Conceptually, the decoder 710 is designed to map the features represented by the feature vectors 714 into meaningful output, which can depend on the task that was assigned to the transformer 712. For example, if the transformer 712 is used for a translation task, the decoder 710 can map the feature vectors 714 into text output in a target language different from the language of the original tokens 702. Generally, in a generative language model, the decoder 710 serves to decode the feature vectors 714 into a sequence of tokens. The decoder 710 can generate output tokens 716 one by one. Each output token 716 can be fed back as input to the decoder 710 in order to generate the next output token 716. By feeding back the generated output and applying self-attention, the decoder 710 is able to generate a sequence of output tokens 716 that has sequential meaning (e.g., the resulting output text sequence is understandable as a sentence and obeys grammatical rules). The decoder 710 can generate output tokens 716 until a special [EOT] token (indicating the end of the text) is generated. The resulting sequence of output tokens 716 can then be converted to a text sequence in post-processing. For example, each output token 716 can be an integer number that corresponds to a vocabulary index. By looking up the text segment using the vocabulary index, the text segment corresponding to each output token 716 can be retrieved, the text segments can be concatenated together, and the final output text sequence can be obtained.

In some examples, the input provided to the transformer 712 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

An input to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 8:
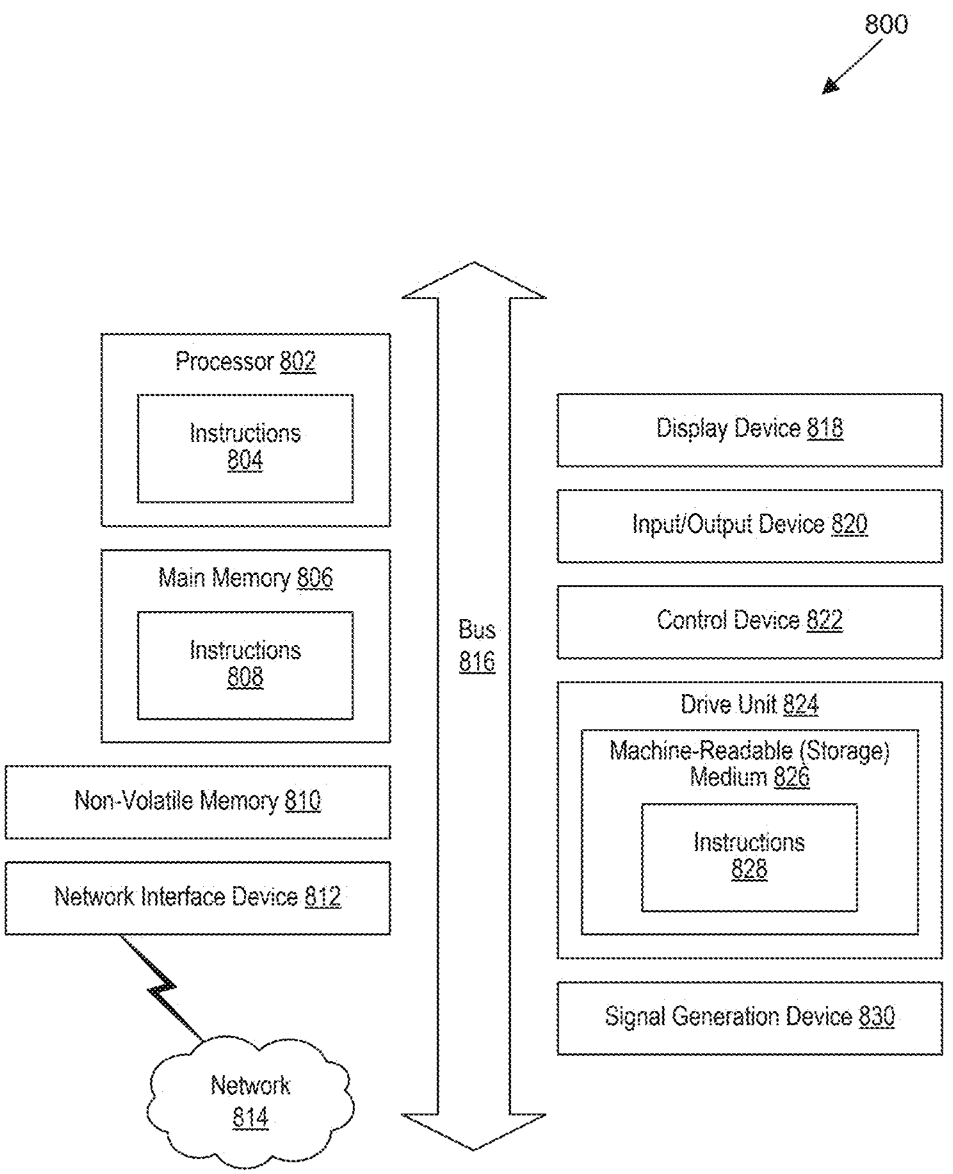
FIG. 8 is a block diagram that illustrates components of a computing device.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

What is claimed is:

1. A security system comprising one or more processors and a memory to implement a hierarchy of security agents, wherein the hierarchy of security agents comprises:

a routing agent configured to:

receive, from a user device, information of an application programming interface (API) endpoint to be tested, wherein the information of the API endpoint comprises a type of the API endpoint and historical vulnerabilities of the API endpoint;

select, based on at least the type of the API endpoint and the historical vulnerabilities of the API endpoint, one or more tools for testing the API endpoint;

determine an order of execution of the one or more tools based on the information of the API endpoint, wherein the order specifies whether a subset of the one or more tools is to be executed in parallel;

identify, based on the information of the API endpoint and the selected one or more tools, one or more task agents from the hierarchy of security agents suitable for testing the API endpoint, wherein each of the one or more task agents is trained to test endpoints using at least one of the selected one or more tools; and route the information of the API endpoints to the one or more task agents;

a plurality of task agents comprising the one or more task agents, wherein the plurality of task agents is configured to:

coordinate an execution time of the one or more tools according to the determined order of execution; and perform testing of the API endpoint based on the coordination; and a supervisor agent configured to:

validate testing results from the one or more task agents; and provide, based on the validated testing results, a report for testing of the API endpoint for the user device.

2. The security system of claim 1, wherein the report indicates at least one update required for the API endpoint based on the testing of the API endpoint.

3. The security system of claim 1, wherein the routing agent is configured to route the information of the API endpoints to the one or more task agents based on load balancing the testing of the API endpoints across the one or more task agents.

4. The security system of claim 1, wherein the supervisor agent is further configured to:

generate one or more confidence scores associated with the validated testing results, wherein the one or more confidence scores indicate a likelihood that the validated testing results are accurate; and provide the one or more confidence scores with the report for the testing of the API endpoint.

5. The security system of claim 1, wherein the routing agent is further configured to determine one or more triggers for performing the testing of the API endpoint, and wherein the one or more task agents are further configured to perform the testing of the API endpoint further based on the one or more triggers.

6. The security system of claim 1, wherein the report indicates one or more vulnerabilities of the API endpoint discovered through the testing and at least one tool, of the one or more tools, used to discover the one or more vulnerabilities.

7. A computer implemented method using one or more processors and a memory, the method comprising:

receiving, from a user device, information of an application programming interface (API) endpoint to be tested, wherein the information of the API endpoint comprises a type of the API endpoint and historical vulnerabilities of the API endpoint;

selecting, based on at least the type of the API endpoint and the historical vulnerabilities of the API endpoint, one or more tools for testing the API endpoint;

determining an order of execution of the one or more tools based on the information of the API endpoint;

identifying, based on the information of the API endpoint and the selected one or more tools, one or more task agents from a hierarchy of security agents suitable for testing the API endpoint, wherein each of the one or more task agents is trained to test endpoints using at least one of the selected one or more tools;

routing the information of the API endpoints to the one or more task agents, coordinating an execution time of the one or more tools according to the determined order of execution, wherein a subset of the one or more tools is to be executed in parallel;

performing testing of the API endpoint, using the one or more task agents, based on the coordination;

validating testing results from the one or more task agents;

providing, based on the validated testing results, a report for testing of the API endpoint for the user device, wherein the report indicates at least one update required for the API endpoint based on the testing of the API endpoint; and causing the API endpoint to implement the at least one update based on the testing of the API endpoint.

8. The method of claim 7, further comprising routing the information of the API endpoints to the one or more task agents by load balancing the testing of the API endpoints across the one or more task agents.

9. The method of claim 7, further comprising:

generating one or more confidence scores associated with the validated testing results, wherein the one or more confidence scores indicate a likelihood that the validated testing results are accurate; and providing the one or more confidence scores with the report for the testing of the API endpoint.

10. The method of claim 7, further comprising determining one or more triggers for performing the testing of the API endpoint, wherein the one or more task agents are further configured to perform the testing of the API endpoint further based on the one or more triggers.

11. The method of claim 7, wherein the report comprises data regarding one or more vulnerabilities of the API endpoint discovered through the testing and at least one tool, of the one or more tools, used to discover the one or more vulnerabilities.

12. The method of claim 11, wherein the at least one update comprises a change to the API endpoint that addresses the one or more vulnerabilities of the API endpoint discovered through the testing.

13. One or more non-transitory, computer-readable media storing instructions that, when executed by one or more processors, cause operations comprising:

receiving, from a user device, information of an application programming interface (API) endpoint to be tested, wherein the information of the API endpoint comprises a type of the API endpoint and historical vulnerabilities of the API endpoint;

selecting, based on at least the type of the API endpoint and the historical vulnerabilities of the API endpoint, one or more tools for testing the API endpoint;

determining an order of execution of the one or more tools based on the information of the API endpoint, wherein the order specifies whether a subset of the one or more tools is to be executed in parallel;

identifying, based on the information of the API endpoint and the selected one or more tools, one or more task agents from a hierarchy of security agents suitable for testing the API endpoint, wherein each of the one or more task agents is trained to test endpoints using at least one of the selected one or more tools;

routing the information of the API endpoints to the one or more task agents, coordinating an execution time of the one or more tools according to the determined order of execution, wherein a subset of the one or more tools is to be executed in parallel;

performing testing of the API endpoint, using the one or more task agents, based on the coordination;

validating testing results from the one or more task agents;

providing, based on the validated testing results, a report for testing of the API endpoint for the user device, wherein the report indicates at least one update required for the API endpoint based on the testing of the API endpoint; and causing the API endpoint to implement the at least one update based on the testing of the API endpoint.

14. The one or more non-transitory, computer-readable media of claim 13, wherein the report comprises data regarding one or more vulnerabilities of the API endpoint discovered through the testing and at least one tool, of the one or more tools, used to discover the one or more vulnerabilities.

15. The one or more non-transitory, computer-readable media of claim 13, wherein the instructions further cause operations comprising routing the information of the API endpoints to the one or more task agents by load balancing the testing of the API endpoints across the one or more task agents.

16. The one or more non-transitory, computer-readable media of claim 13, wherein the instructions further cause operations comprising:

generating one or more confidence scores associated with the validated testing results, wherein the one or more confidence scores indicate a likelihood that the validated testing results are accurate; and providing the one or more confidence scores with the report for the testing of the API endpoint.

17. The one or more non-transitory, computer-readable media of claim 13, wherein the instructions further cause operations comprising determining one or more triggers for performing the testing of the API endpoint, wherein the one or more task agents are further configured to perform the testing of the API endpoint further based on the one or more triggers.

* * * * *